(12) United States Patent
Gardner et al.

(10) Patent No.: US 11,009,134 B2
(45) Date of Patent: May 18, 2021

(54) SPILL PREVENTION PLUG

(71) Applicant: 1872809 ALBERTA LTD., Grande Cache (CA)

(72) Inventors: Dallas Gardner, Fort Kent (CA); John Wilgus, Grande Cache (CA)

(73) Assignee: 1872809 ALBERTA LTD., Grande Cache (CA)

(*) Notice: Subject to any disclaimer, the term of this patent is extended or adjusted under 35 U.S.C. 154(b) by 0 days.

(21) Appl. No.: 16/129,882

(22) Filed: Sep. 13, 2018

(65) Prior Publication Data

US 2019/0085985 A1 Mar. 21, 2019

(30) Foreign Application Priority Data

Sep. 19, 2017 (CA) .................................. CA2979481

(51) Int. Cl.
  *F16K 5/04* (2006.01)
  *B67D 7/32* (2010.01)
  *F16K 15/02* (2006.01)
  *B67D 7/02* (2010.01)
  *B67D 7/38* (2010.01)

(52) U.S. Cl.
  CPC .......... *F16K 5/0428* (2013.01); *F16K 5/0442* (2013.01); *F16K 15/028* (2013.01); *B67D 7/0294* (2013.01); *B67D 7/3209* (2013.01); *B67D 7/38* (2013.01)

(58) Field of Classification Search
  CPC ...... F16K 15/02; F16K 15/021; F16K 15/023; F16K 15/025; F16K 15/06; F16K 15/028; F16K 15/063; F16K 5/0428; F16K 5/0442; B67D 7/3209; B67D 7/38

USPC .......... 251/149.1, 149.6; 137/614.03–614.05
  See application file for complete search history.

(56) References Cited

U.S. PATENT DOCUMENTS

| | | | | |
|---|---|---|---|---|
| 2,710,023 A | * | 6/1955 | Blackford et al. .... | F16K 15/028 137/543.19 |
| 4,902,034 A | * | 2/1990 | Maguran et al. ......... | F16F 9/46 188/266.6 |
| 7,147,004 B1 | * | 12/2006 | Hartman .................. | F16L 37/18 137/614.06 |
| 9,562,639 B1 | * | 2/2017 | Hartman et al. ......... | F16L 37/18 |
| 2005/0236596 A1 | * | 10/2005 | Nowling et al. .... | F16L 37/0982 251/149 |

* cited by examiner

*Primary Examiner* — Kevin L Lee
(74) *Attorney, Agent, or Firm* — Finch & Maloney, PLLC; Michael J. Bujold

(57) ABSTRACT

A spill prevention plug is provided. A plug body has an interior side and an exterior side with a threaded aperture that extends from the interior side to the exterior side of the plug body. The interior side of the plug body is removably attachable to a hose. A bushing threadingly engages the threaded aperture. A one way valve with a first end and a second end is provided with the first end of the one way valve engaging the bushing from the exterior side of the plug body. The one way valve being movable between an open position in which fluid flows through the one way valve from the interior side of the plug body to the exterior side of the plug body and a closed position in which fluid is prevented from flowing through the one way valve. An adapter for connection to a pump engages the second end of the one way valve.

13 Claims, 4 Drawing Sheets

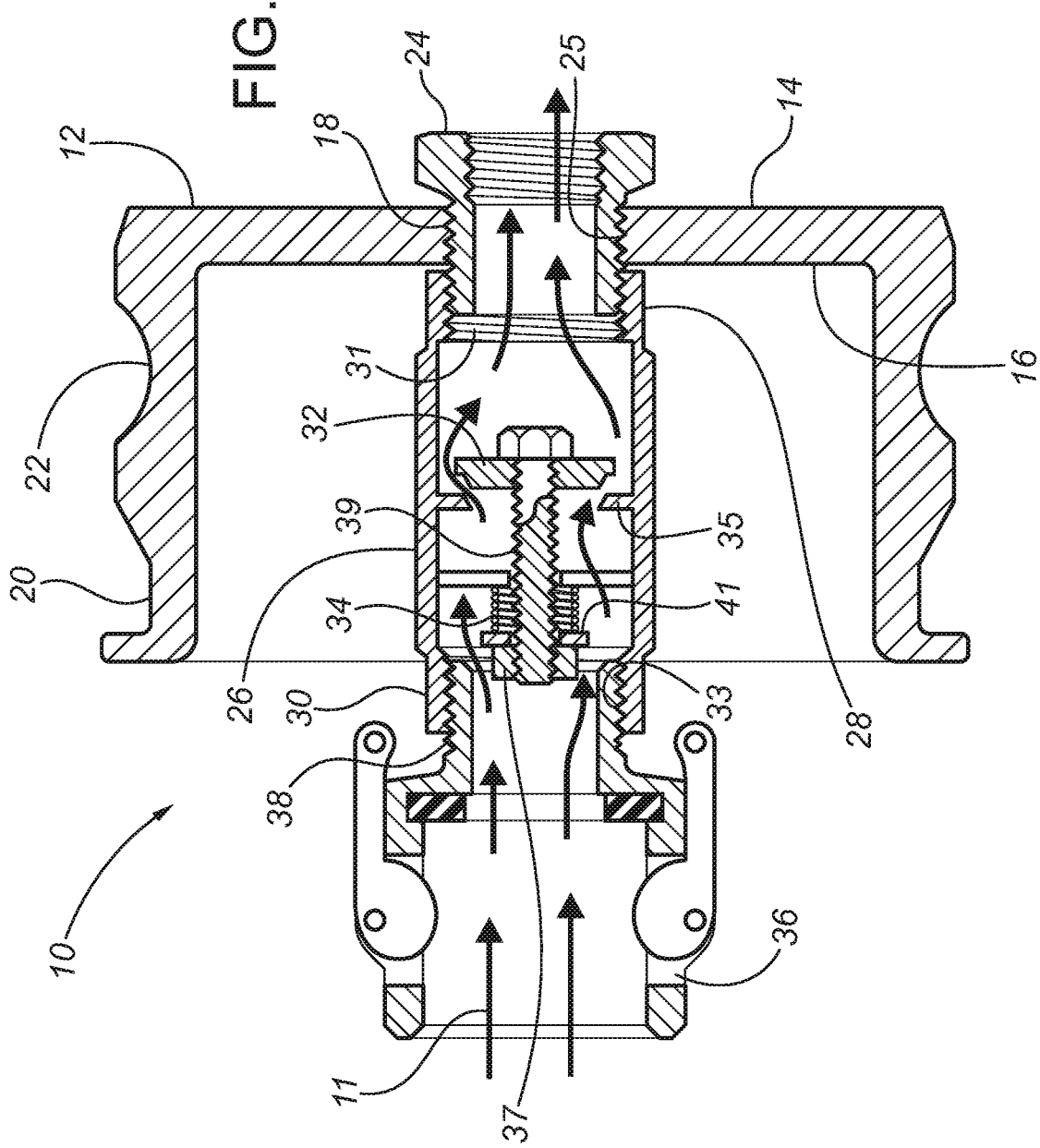

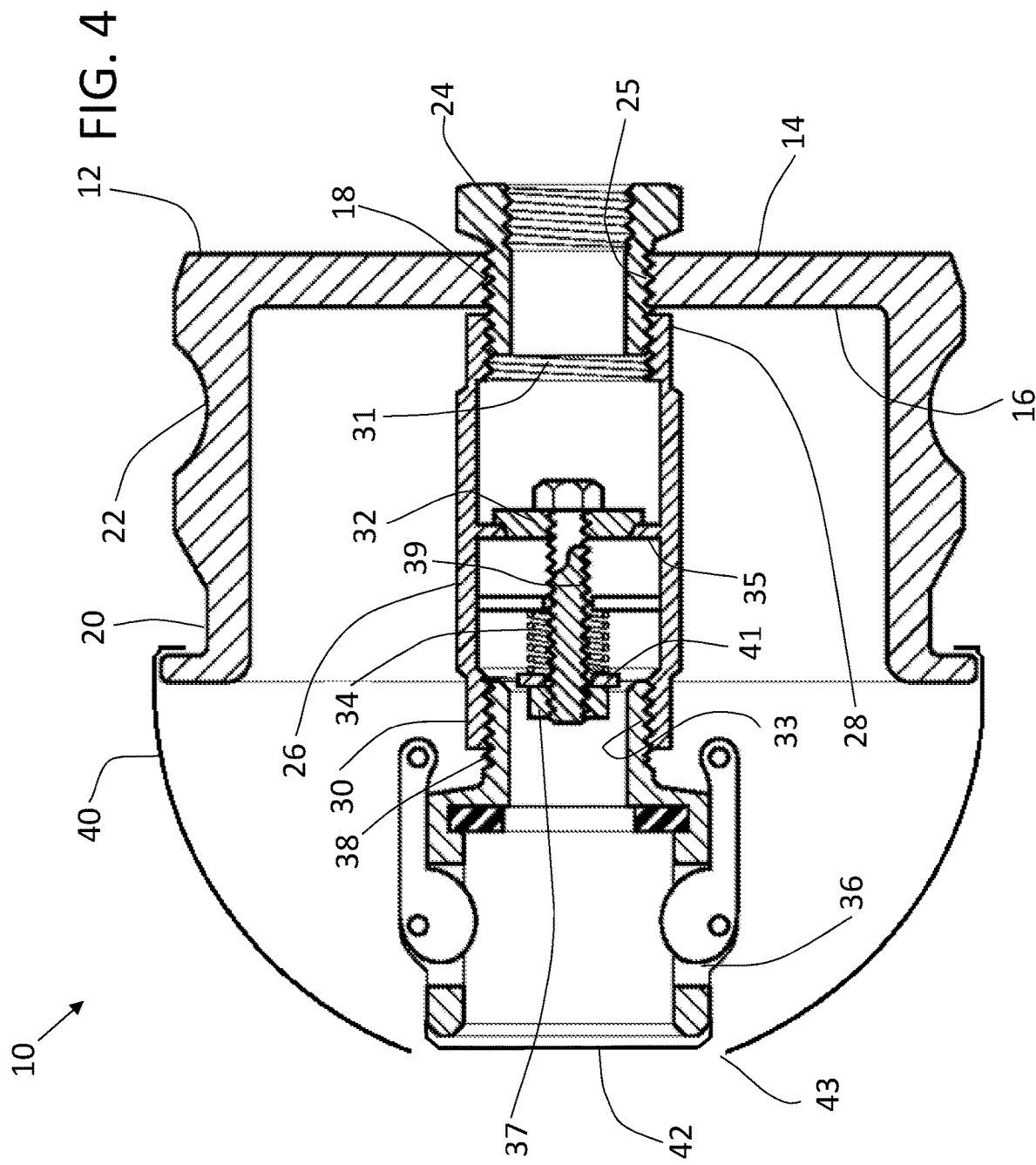

SPILL PREVENTION PLUG

FIELD OF THE DISCLOSURE

The present application relates generally to a spill prevention plug for use on hoses to prevent spillage of fluid. In particular, it relates to a spill prevention plug for use on fluid hauling tanker trucks with fluid pumps.

BACKGROUND

This section provides background information to facilitate a better understanding of the various aspects of the invention. It should be understood that the statements in this section of this document are to be read in this light, and not as admissions of prior art.

Spills and leaks during the transfer of fluids out of fluid hauling tanker trucks is common. These spills and leaks cause a loss of valuable resources and generally time must be spent to clean up the spill. Even if cleaned up promptly, some fluids may have a negative impact on the environment. While a simple plug can be used to plug the hoses that transfer the fluid, these plugs must be removed prior to the transfer of fluid. During that time, fluid may leak from the hose.

BRIEF SUMMARY

There is provided a spill prevention plug. A plug body has an interior side and an exterior side. A threaded aperture extends from the interior side to the exterior side of the plug body. A bushing threadingly engages the threaded aperture. A one way valve is provided that has a first end and a second end. The first end of the one way valve engages the bushing from the exterior side of the plug body. The one way valve is movable between an open position in which fluid flows through the one way valve from the interior side of the plug body to the exterior side of the plug body and a closed position in which fluid is prevented from flowing through the one way valve. An adaptor for connecting to a hose or pump engages the second end of the one way valve.

In one embodiment, the plug body is a cam-lock dust plug.

In one embodiment, the bushing is a brass bushing. A brass bushing is preferred when the spill prevention plug is used in relation to flammable liquids as the brass will not cause a spark and is relatively corrosion proof.

In one embodiment, the one way valve is spring loaded.

In one embodiment, the adapter is a cam-lock fitting. The cam-lock fitting may be a female cam-lock fitting.

In one embodiment, an end adaptor is provided that is removably attached to the cam-lock fitting for attachment to different types of hoses.

In one embodiment, a protective cage is removably attached to the plug body such that it protects the one way valve and the adapter. The protective cage may have an aperture through which a hose to be connected to the adapter may pass.

In one embodiment, an end plug is provided for sealing the adapter. An end plug may prevent spills from occurring in the event that the one way valve fails.

There is also provided a spill prevention plug. The spill prevention plug has a plug body with an interior side and an exterior side. A threaded aperture extends from the interior side of the plug body to the exterior side of the plug body. A brass bushing threadingly engages the threaded aperture. A spring loaded one way valve is provided having a first end and a second end. The first end of the one way valve engages the bushing such that the one way valve engages the bushing from the exterior side of the plug body. The one way valve being movable between an open position in which fluid flows through the one way valve from the interior side of the plug body to the exterior side of the plug body and a closed position in which fluid is prevented from flowing through the one way valve. A cam-lock fitting engages the second end of the one way valve.

In one embodiment, the plug body is a cam-lock dust plug.

In one embodiment, the cam-lock fitting is a female cam-lock fitting.

In one embodiment, an end adaptor is removably attached to the cam-lock fitting for the attachment of different types of hoses.

In one embodiment, a protective cage is removably attached to the plug body such that it protects the one way valve and cam-lock fitting. The protective cage may have an aperture through which a hose to be connected to the cam-lock fitting may pass.

In one embodiment, an end plug is provided for sealing the cam-lock fitting. An end plug may prevent spills from occurring in the event that the one way valve fails.

BRIEF DESCRIPTION OF THE DRAWINGS

These and other features will become more apparent from the following description in which references are made to the following drawings, in which numerical references denote like parts. The drawings are for the purpose of illustration only and are not intended to in any way limit the scope of the invention to the particular embodiments shown.

FIG. 3 is a side elevation view, in section, of the spill prevention plug in the open position.

FIG. 4 is a side elevation view, in section, of the spill prevention plug with a protective cage.

DETAILED DESCRIPTION OF THE PREFERRED EMBODIMENTS

Figure 1:
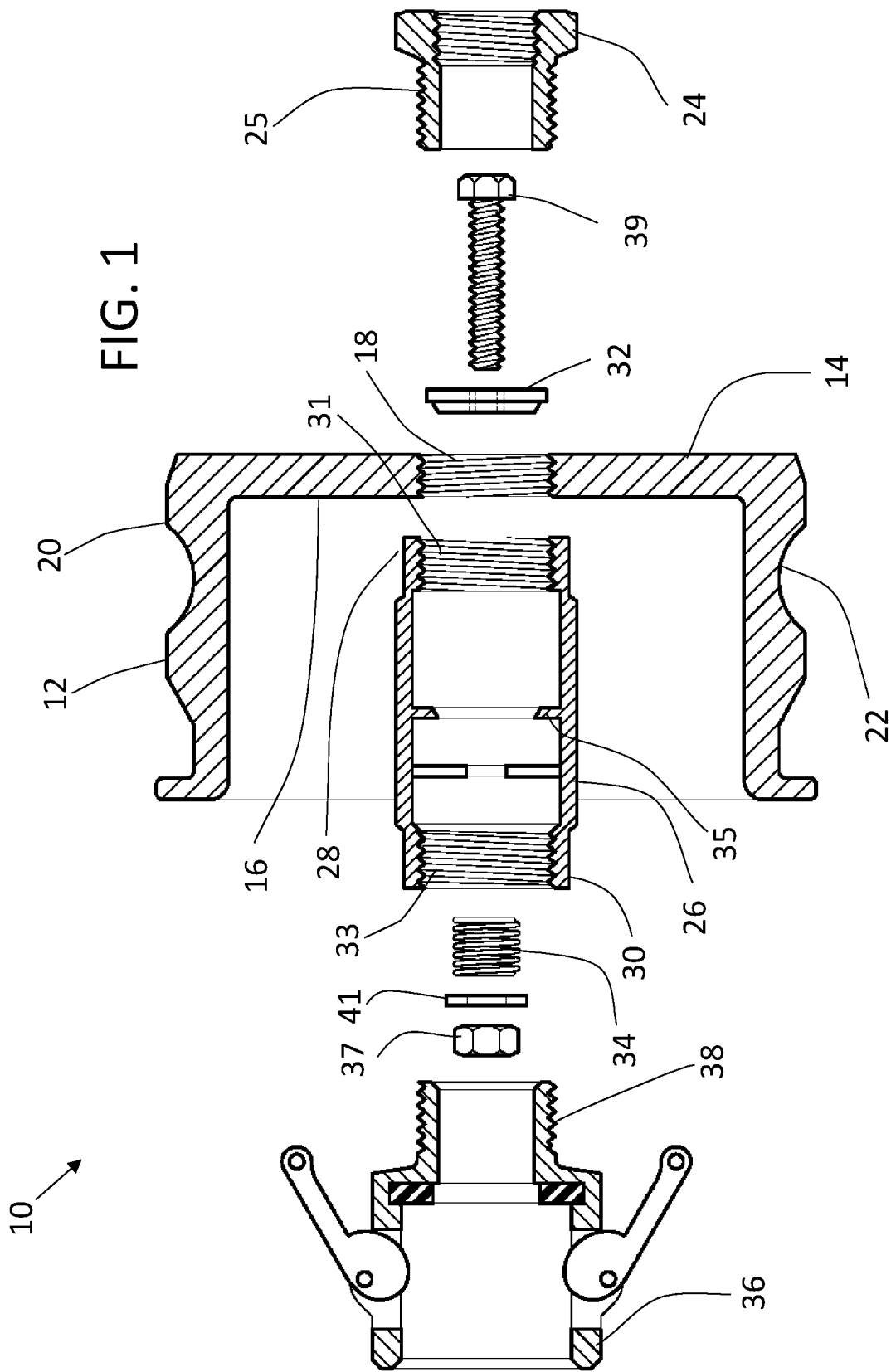
FIG. 1 is an exploded view of a spill prevention plug.

A spill prevention plug, generally identified by reference numeral 10, will now be described with reference to FIG. 1 through FIG. 4.

Figure 2:
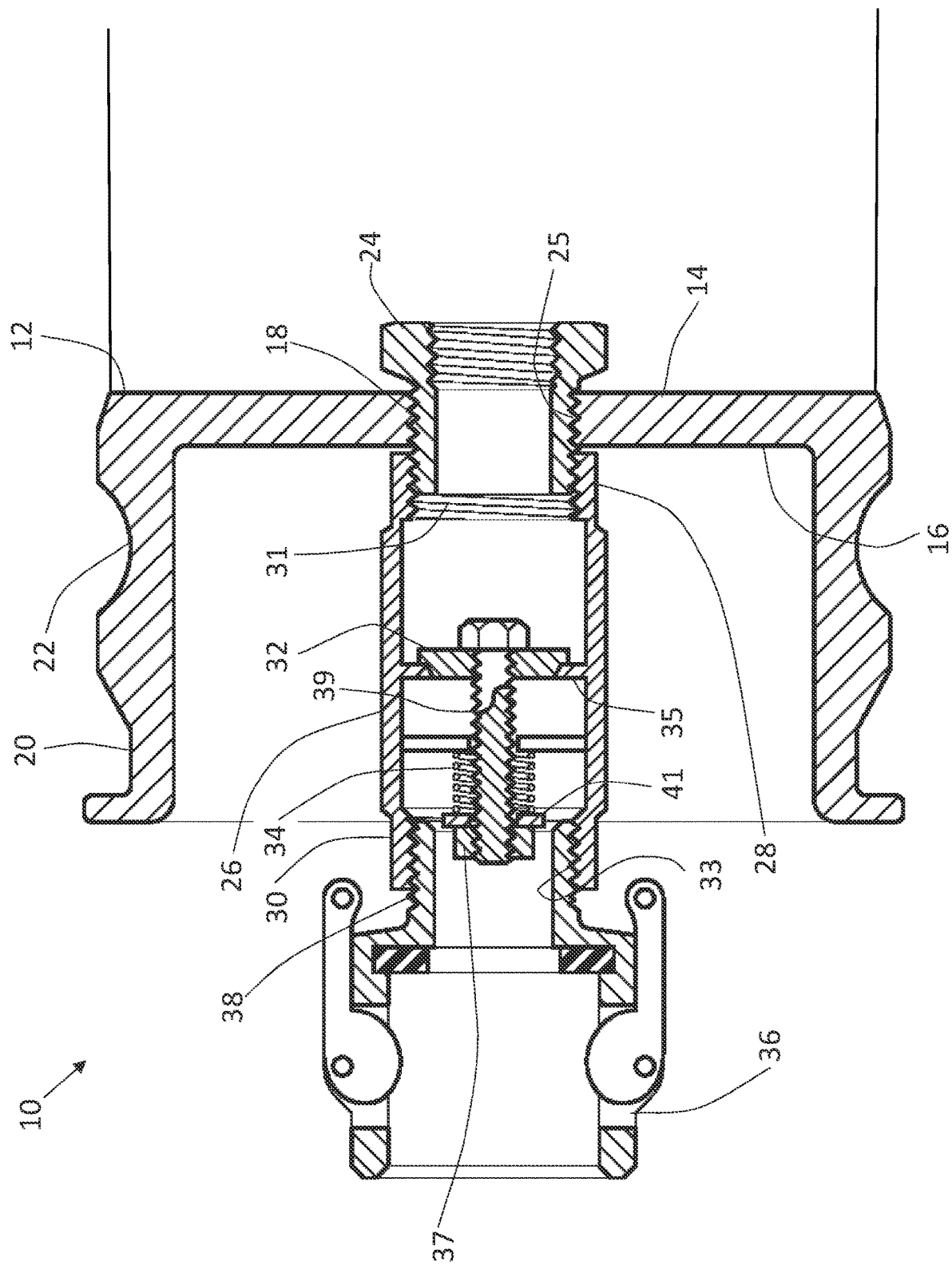
FIG. 2 is a side elevation view, in section, of the spill prevention plug in the closed position.

Referring to FIG. 2, a spill prevention plug 10 has a plug body 12 with an interior side 14 and an exterior side 16. A threaded aperture 18 extends from interior side 14 to exterior side 16 of plug body 12. Plug body 12 is removably attachable to a hose, not shown, such that the interior side 14 of plug body 12 comes into contact with the connection end of the hose. Plug body 12 is designed to attach to the female end of an industrial cam-lock hose. In the embodiment shown, plug body 12 is a cam-lock dust plug that has a cylindrical outer wall 20 with a groove 22. Groove 22 is used for the purpose of locking plug body 12 in position on a hose, not shown. A person of skill will understand that plug body 12 may be any other type of plug known in the art and may connect to the hose in any manner known in the art. A bushing 24 with exterior threads 25 threadingly engages threaded aperture 18. In the embodiment shown in FIG. 1, bushing 24 is threaded from interior side 14 of plug body 12 towards exterior side 16 of plug body 12. It will be understood that different types of bushings may be used and the way in which these bushings are threaded into threaded aperture 18 may differ from the embodiment described above. The use of a bushing 24 made of brass is generally preferred due to the anti-corrosion properties of the brass and unlikelihood of the brass sparking which could be dangerous when used in association with flammable materials.

Referring to FIG. 2, a one way valve 26 has a first end 28 and a second end 30 and is biased to the closed position. In the embodiment shown, first end 28 and second end 30 of one way valve 26 each have interior threads 31 and 33, respectively. Threads 31 of first end 28 of one way valve 26 engages threads 25 of bushing 24 from exterior side 16 of plug body 12. One way valve 26 allows for the suction of air when spill prevention plug 10 is placed in the female end of an industrial cam-lock hose. It does not allow positive pressure of fluid or air. Referring to FIG. 3, one way valve 26 is movable between an open position in which fluid 11 flows through the one way valve 26 from interior side 14 of plug body 12 to exterior side 16 of plug body 12 and a closed position, shown in FIG. 2, in which fluid is prevented from flowing through one way valve 26. In the embodiment shown, one way valve 26 has a valve member 32 and a valve seat 35. Valve member 32 is biased into contact with valve seat 35 by a spring 34. When in this closed position, no fluid may pass through one way valve 26. In the embodiment shown, valve member 32 and spring 34 is held within one way valve 26 through the use of a nut 37, bolt 39 and washer 41. The pressure exerted by fluid on first end 28 of one way valve 26 helps to maintain valve member 32 in contact with valve seat 35 when in the closed position of one way valve 26. Suction provided by a pump, not shown and generally positioned on the hose, is required to overcome the biasing force of spring 34 to move valve member 32 to the open position, out of contact with valve seat 35 and allow fluid to pass through one way valve 26. A person of skill will understand that different types of one way valves 26 may be used. Where a pump is not provided on the hose, an adapter 36 is provided for connection to a pump. Adapter 36 engages second end 30 of one way valve 26. In the embodiment shown, adapter 36 is a female cam-lock fitting with exterior threads 38 that engage interior threads 33 of second end 30 of one way valve. A person of skill will understand that different types of adapters may be used depending upon the connection to be made to the pump.

For convenience, an additional end adapter, not shown, may be removably attached to adapter 36 to allow for the attachment of different types of hoses or pumps. When adapter 36 is a female cam-lock fitting, an adapter with two male ends may be attached to facilitate use of spill prevention plug 10 with a hose or pump having a female end. An end adapter that provides for greater flexibility in the distance between adapter 36 and the pump or hose it is to connect to may also be used. A person of skill will understand that other types of adapters may be used.

Referring to FIG. 4, a protective cage 40 may be removably attached to plug body 12 to protect one way valve 26 and adapter 36 from damage. Protective cage 40 may have an aperture 43 through which a hose or pump connection to be connected to adapter 36 may pass. While not shown, protective cage 40 may be attached to plug body 12 with a hinge to allow protective cage 40 to be moved into a protective orientation where one way valve 26 and adapter 36 are positioned within it and an unprotected orientation that allows access to one way valve 26 and adapter 36.

Spill prevention plug 10 can be used to seal a hose from positive pressures and contain any residual fluid within the hose after pumping is complete. Leaks and spills may be prevented when spill prevention plug 10 is installed on a hose and dirt and debris can be prevented from entering the hose.

In the event that one way valve 26 fails, it may be beneficial to attach an end plug 42 to adapter 36 to prevent spills or leaks from occurring.

Any use herein of any terms describing an interaction between elements is not meant to limit the interaction to direct interaction between the subject elements, and may also include indirect interaction between the elements such as through secondary or intermediary structure unless specifically stated otherwise.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent that changes may be made to the illustrative embodiments, while falling within the scope of the invention. As such, the scope of the following claims should not be limited by the preferred embodiments set forth in the examples and drawings described above, but should be given the broadest interpretation consistent with the description as a whole.

What is claimed is:

1. A spill prevention plug, comprising:
a plug body having an interior side and an exterior side, a threaded aperture extending from the interior side to the exterior side of the plug body, the interior side of the plug body being removably attachable to a hose;
a bushing threadingly engaging the threaded aperture;
a one way valve having a first end and a second end, the first end of the one way valve engaging the bushing from the exterior side of the plug body, the one way valve being movable between an open position in which fluid flows through the one way valve from the interior side of the plug body to the exterior side of the plug body and a closed position in which fluid is prevented from flowing through the one way valve;
an adapter for connection to a pump engaging the second end of the one way valve; and
a protective cage being removably attached to the plug body such that the protective cage protects the one way valve and the adapter.

2. The spill prevention plug of claim 1 wherein the plug body is a cam-lock dust plug.

3. The spill prevention plug of claim 1 wherein the bushing is a brass bushing.

4. The spill prevention plug of claim 1 wherein the one way valve is spring loaded.

5. The spill prevention plug of claim 1 wherein the adapter is a cam-lock fitting.

6. The spill prevention plug of claim 5 wherein the cam-lock fitting is a female cam-lock fitting.

7. The spill prevention plug of claim 1 wherein the protective cage has an aperture through which a hose to be connected to the adapter may pass.

8. The spill prevention plug of claim 1 further comprising an end plug for sealing the adapter.

9. A spill prevention plug, comprising:
a plug body having an interior side and an exterior side, a threaded aperture extending from the interior side to the exterior side of the plug body, the interior side of the plug body being removably attachable to a hose;

a brass bushing threadingly engaging the threaded aperture;

a spring loaded one way valve having a first end and a second end, the first end of the one way valve engaging the bushing such that the one way valve engages the bushing from the exterior side of the plug body, the one way valve being movable between an open position in which fluid flows through the one way valve from the interior side of the plug body to the exterior side of the plug body and a closed position in which fluid is prevented from flowing through the one way valve;

a cam-lock fitting for connection to a pump engaging the second end of the one way valve; and a protective cage being removably attached to the plug body such that the protective cage protects the one way valve and the cam-lock fitting.

10. The spill prevention plug of claim 9 wherein the plug body is a cam-lock dust plug.

11. The spill prevention plug of claim 9 wherein the cam-lock fitting is a female cam-lock fitting.

12. The spill prevention plug of claim 9 wherein the protective cage has an aperture through which a hose to be connected to the cam-lock fitting may pass.

13. The spill prevention plug of claim 9 further comprising an end plug for sealing the cam-lock fitting.

* * * * *